United States Patent
Boland

(10) Patent No.: US 9,393,934 B2
(45) Date of Patent: Jul. 19, 2016

(54) WINDSCREEN WIPER ARM AND METHOD FOR PRODUCING THE SAME

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 0 days.

(21) Appl. No.: 14/390,840

(22) PCT Filed: Apr. 5, 2012

(86) PCT No.: PCT/EP2012/056356
§ 371 (c)(1),
(2), (4) Date: Feb. 23, 2015

(87) PCT Pub. No.: WO2013/149676
PCT Pub. Date: Oct. 10, 2013

(65) Prior Publication Data
US 2015/0158462 A1 Jun. 11, 2015

(51) Int. Cl.
*B60S 1/34* (2006.01)
*F16B 19/00* (2006.01)

(52) U.S. Cl.
CPC .............. *B60S 1/345* (2013.01); *B60S 1/3413* (2013.01); *B60S 1/3429* (2013.01); *B60S 1/3431* (2013.01); *B60S 1/3436* (2013.01); *B60S 1/3438* (2013.01); *F16B 19/00* (2013.01); *Y10T 29/4984* (2015.01)

(58) Field of Classification Search
CPC .......... B60S 1/34; B60S 1/345; B60S 1/3431; B60S 1/3436; B60S 1/3413; F16B 19/00; Y10T 29/4984
USPC .......................... 15/250.351, 250.352, 250.43
See application file for complete search history.

(56) References Cited

U.S. PATENT DOCUMENTS

| | | | |
|---|---|---|---|
| 2,838,782 A | 6/1958 | Wallis | |
| 7,484,264 B2 * | 2/2009 | Kraemer | B60S 1/381 15/250.201 |
| 7,690,073 B2 * | 4/2010 | Marmoy | B60S 1/3856 15/250.32 |
| 2002/0178527 A1 | 12/2002 | Heinrich et al. | |

FOREIGN PATENT DOCUMENTS

| | | |
|---|---|---|
| EP | 1095830 A2 | 5/2001 |
| JP | 2009269442 A | 11/2009 |

* cited by examiner

*Primary Examiner* — Gary Graham
(74) *Attorney, Agent, or Firm* — Robert L. Stearns; Dickinson Wright, PLLC

(57) ABSTRACT

A windscreen wiper arm, particularly for automobiles, has a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, wherein the part is provided with opposite abutting surfaces for abutting against the side walls of the arm member; structure is provided on the mounting head and the arm member for limiting a pivot angle of the arm member, in the form of at least one guiding groove on one of the abutting surfaces of the part of the mounting head, as well as at least one outwardly extending finger on the arm member cooperating with the guiding groove. The finger is movable in the guiding groove between a first position corresponding with a wiping position of the arm member and a second position corresponding with a mounting position of the arm member. The finger extends outwardly from a base of the U-shaped cross-section of the arm member in a direction towards the drive shaft.

11 Claims, 7 Drawing Sheets

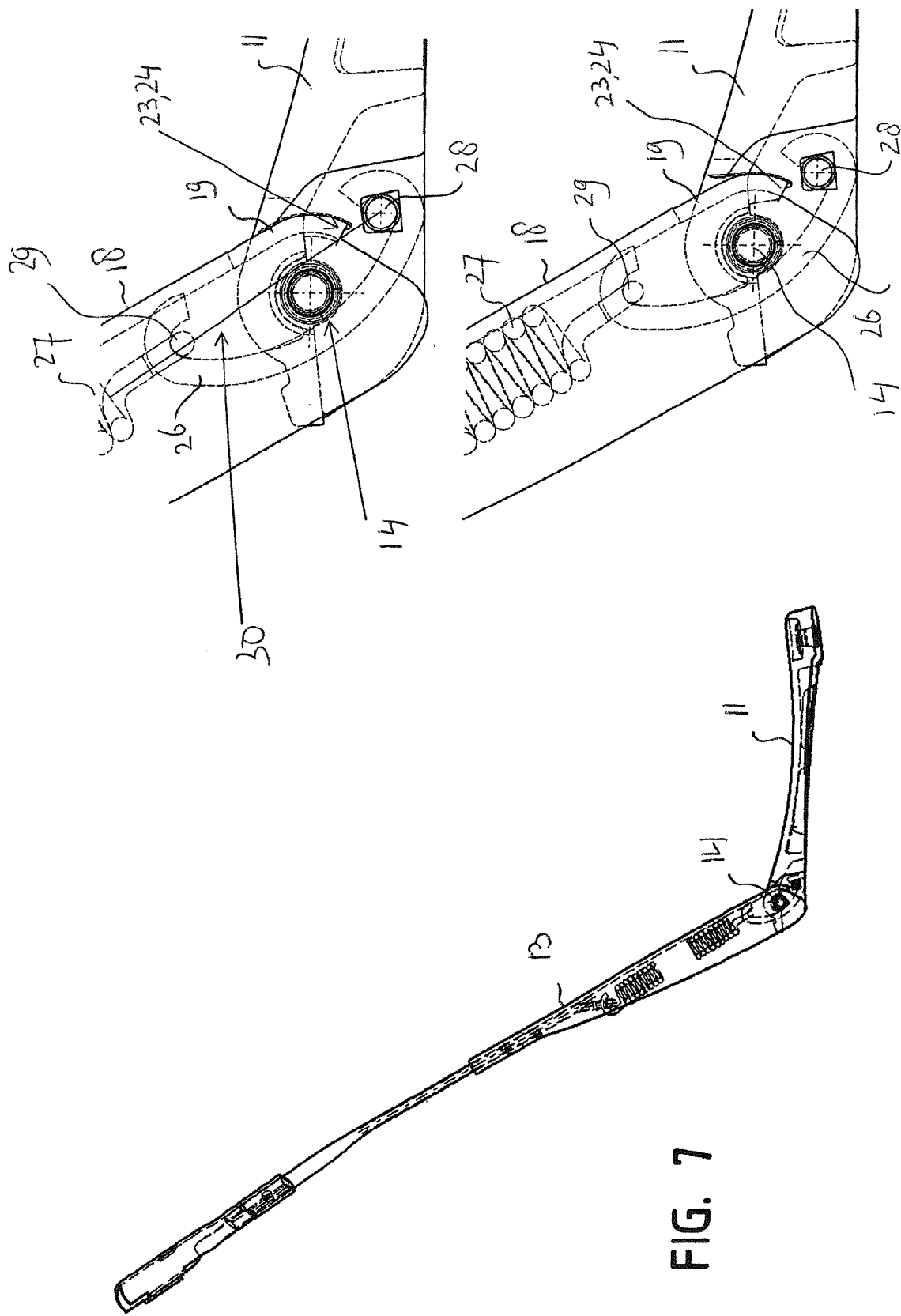

WINDSCREEN WIPER ARM AND METHOD FOR PRODUCING THE SAME

BACKGROUND OF THE INVENTION

Technical Field

The present invention relates to a windscreen wiper arm, particularly for automobiles, comprising a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, wherein the part is provided with opposite abutting surfaces for abutting against the side walls of the arm member, wherein means are provided on the mounting head and the arm member for limiting a pivot angle of the arm member.

Such a windscreen wiper arm is known from European patent publication no. 1 095 830. The wiper arm described therein has an arm part and a so-called fastener part with connecting joint, and a stop unit to limit a relative movement. The stop unit consists of two stops at a distance to each other, and a stop element. The stop element is moved into contact with the stops during relative movement of arm part and/or fastener part. The stops are formed integral with arm or fastener part, and the stop element is integral with the other of the two components.

A disadvantage of the windscreen wiper arm known from the above European patent publication is that, due to the fact that many cars have their own specifications as to a maximum pivot angle referred to above, for those cars a specific windscreen wiper arm and mounting head has to be designed and manufactured. Obviously, this needs complex machinery, tools, with all the expenses involved.

SUMMARY OF THE INVENTION AND ADVANTAGES

It is an object of the invention to obviate this disadvantage, in the sense that at minimum costs—without using complex machinery and additional tools—windscreen wiper arms with mutually minimum modifications are proposed, which can be mounted on different cars. It is noted that the present invention is not restricted to cars, but also refers to rail coaches and other (fast) vehicles.

Thereto, according to the invention a windshield wiper arm mentioned in the preamble is characterized in that the means comprise at least one guiding groove on one of the abutting surfaces of the part of the mounting head, as well as at least one outwardly extending finger on the arm member cooperating with the guiding groove, wherein the finger is movable in the guiding groove between a first position corresponding with a wiping position of the arm member and a second position corresponding with a mounting position of the arm member, and wherein the finger extends outwardly from a base of the U-shaped cross-section of the arm member in a direction towards the drive shaft. This enables to mount windscreen wiper arms mutually only differing in the sense that only the shape (particularly the effective length) of the groove is modified by using a small modification in the respective mould, on every type of car, if necessary.

The finger is in one piece with the U-shaped arm member and directs in a direction towards the mounting head, i.e. away from a windscreen wiper blade to be attached to the arm member. The finger is allowed to slide inside the groove between the first and second positions. In the second position or "service position" of the arm member (that is a mounting, cleaning and/or repair position, wherein the arm member is in an upright position relative to the mounting head) a free end of the finger abuts against an end wall of the groove, whereas in the first position or "work position" of the arm member (that is a wiping position, wherein the arm member extends parallel to a windscreen to be wiped) the free end of the finger is spaced-apart from the end wall of the groove. The free end of the finger and the end wall of the groove each form a stop surface avoiding that in the second position the arm member is allowed to be pivoted beyond a predetermined angle with respect to the mounting head. As both stop surfaces are part of rigid elements of the windscreen wiper arm, namely the rigid arm member and the rigid mounting head, respectively, both stop surfaces are relatively large and strong and thus very effective.

Further, no extra tool step in manufacturing the U-shaped arm member is now needed, whereas no extra raw material is now used.

In a preferred embodiment of a windscreen wiper device in accordance with the invention the finger is curved.

Particularly, the finger is curved near its free end.

Preferably, the guiding groove is curved as well. More preferably, the finger and the guiding groove are correspondingly shaped, as far as their curvatures are concerned.

In another preferred embodiment of a windscreen wiper device according to the invention, in a wiping position of the arm member, one of the side walls of the arm member covers the groove from the outside. Particularly, in order to ensure that the arm member and thus the wiper blade connected thereto is pressed onto a windscreen to be wiped, a hook-shaped bracket connected to a spring is hooked with its first end on a pin on the mounting head and with its second end onto a part of the arm member, wherein both the pivot pin and the pin on the mounting head are located above the hook-shaped element, that is on one side thereof above a central axis of the spring (line 30), shown in FIG. 7. The pivot pin is located on the other side of the line 30. Consequently, the groove is not visible from the outside. Further, dust and/or ice is prevented to enter the groove, so that an efficient and reliable articulation between the arm member and the mounting head is maintained at all times. Instead of or in addition thereto the groove is at least partly open at its bottom, so that dust and/or ice may leave the groove.

In another preferred embodiment of a windscreen wiper device in accordance with the invention the groove extends along a part of a circle. The finger may have a similar shape, so that also the finger extends along a part of a circle.

In another preferred embodiment of a windscreen wiper device according to the invention the means comprise two guiding grooves on each abutting surface of the part of the mounting head, as well as two outwardly extending fingers on the arm member each cooperating with a guiding groove.

Particularly, the fingers have a mutually corresponding shape and each extend outwardly from a base of the U-shaped cross-section of the arm member in a direction towards the drive shaft. the fingers are thus spaced-apart. Preferably, the fingers are in one piece with the U-shaped arm member. More in particular, the fingers are located near longitudinal edges of the base of the U-shape cross-section of the arm member.

In another preferred embodiment of a windscreen wiper device in accordance with the invention the arm member is made of a metal, such as steel. Preferably, the mounting head is made of aluminium. In the alternative, both the arm member and the mounting head are made of a plastic material.

The invention refers also to a mounting head and/or an arm member as defined in a windscreen wiper arm according to the invention.

The invention also relates to a windscreen wiper device comprising a windscreen wiper arm in accordance with the invention. Particularly, the windscreen wiper device comprises an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein ends of the longitudinal strip are connected with a respective connecting piece, which windscreen wiper device comprises a connecting device for the windscreen wiper arm in accordance with the invention. Such a windscreen wiper device is thus designed as a "yokeless" wiper device or "flat blade", wherein use is no longer made of several yokes pivotally connected to each other, but wherein the wiper blade is biassed by the carrier element, as a result of which it exhibits a specific curvature. The present windscreen wiper arm may comprise a pivot pin on one side thereof, which is inserted sideways into a through hole of the connecting device. It is noted that the present invention is not restricted to such a "flat blade", although being advantageous therein, but also extends to other types of windscreen wiper devices, such as the ones with yokes as referred to above.

Finally, the invention also refers to a method for manufacturing a windscreen wiper arm, particularly for automobiles, comprising a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin, wherein the part is provided with opposite abutting surfaces for abutting against the side walls of the arm member, wherein means are provided on the mounting head and the arm member for limiting a pivot angle of the arm member, characterized in that the means are provided with at least one guiding groove on one of the abutting surfaces of the part of the mounting head, as well as with at least one outwardly extending finger on the arm member cooperating with the guiding groove, wherein the finger is movable in the groove between a first position corresponding with a wiping position of the arm member and a second position corresponding with a mounting position of the arm member, and wherein the finger extends outwardly from a base of the U-shaped cross-section of the arm member in a direction towards the drive shaft.

THE DRAWINGS

The invention will now be explained in more detail with reference to figures illustrated in a drawing, wherein:

FIGS. 6 and 7 correspond to FIG. 5, but now referring to a "working position" and a "service position" of the windscreen wiper arm.

DETAILED DESCRIPTION

Figure 1:
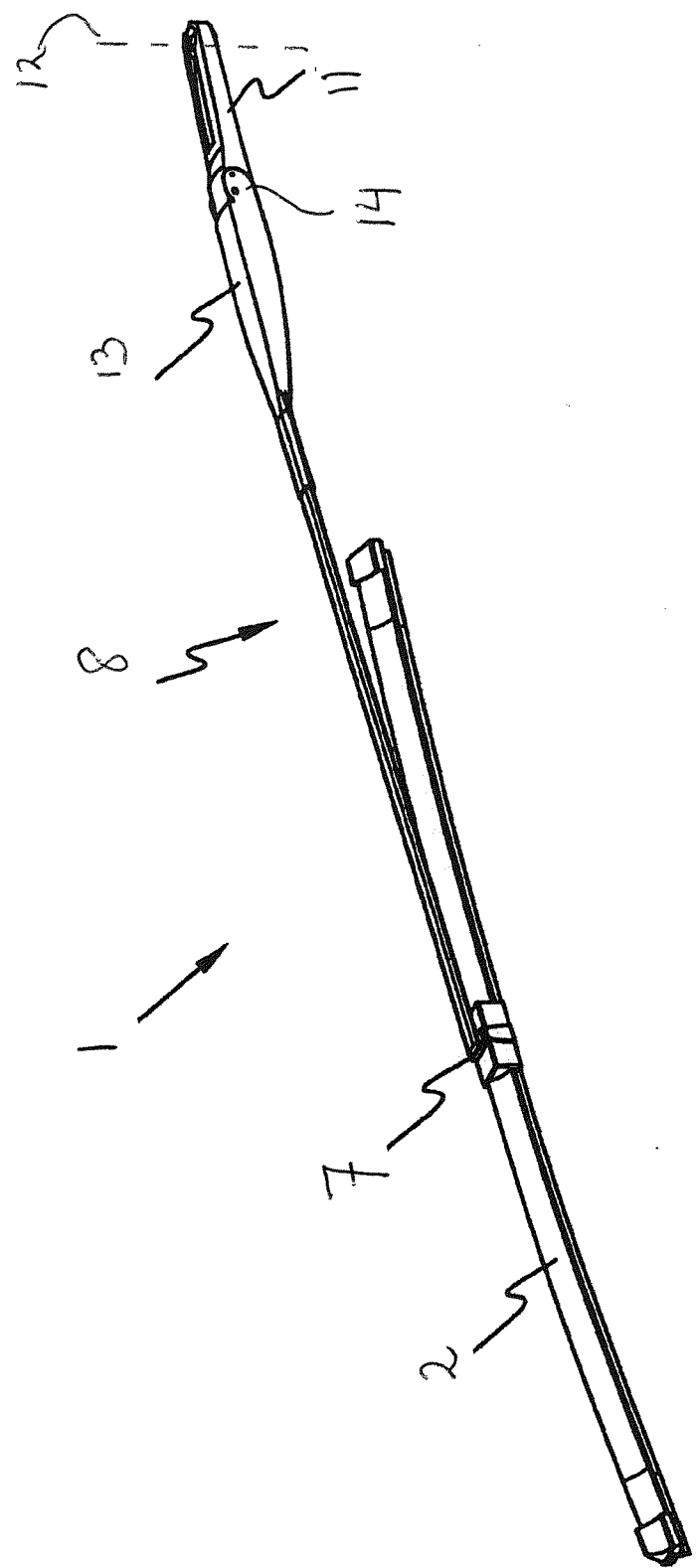
FIG. 1 is a perspective, schematic view of a preferred embodiment of a windscreen wiper device equipped with a windscreen wiper arm according to the invention, wherein the windscreen wiper arm is in a wiping position.
Figure 2:
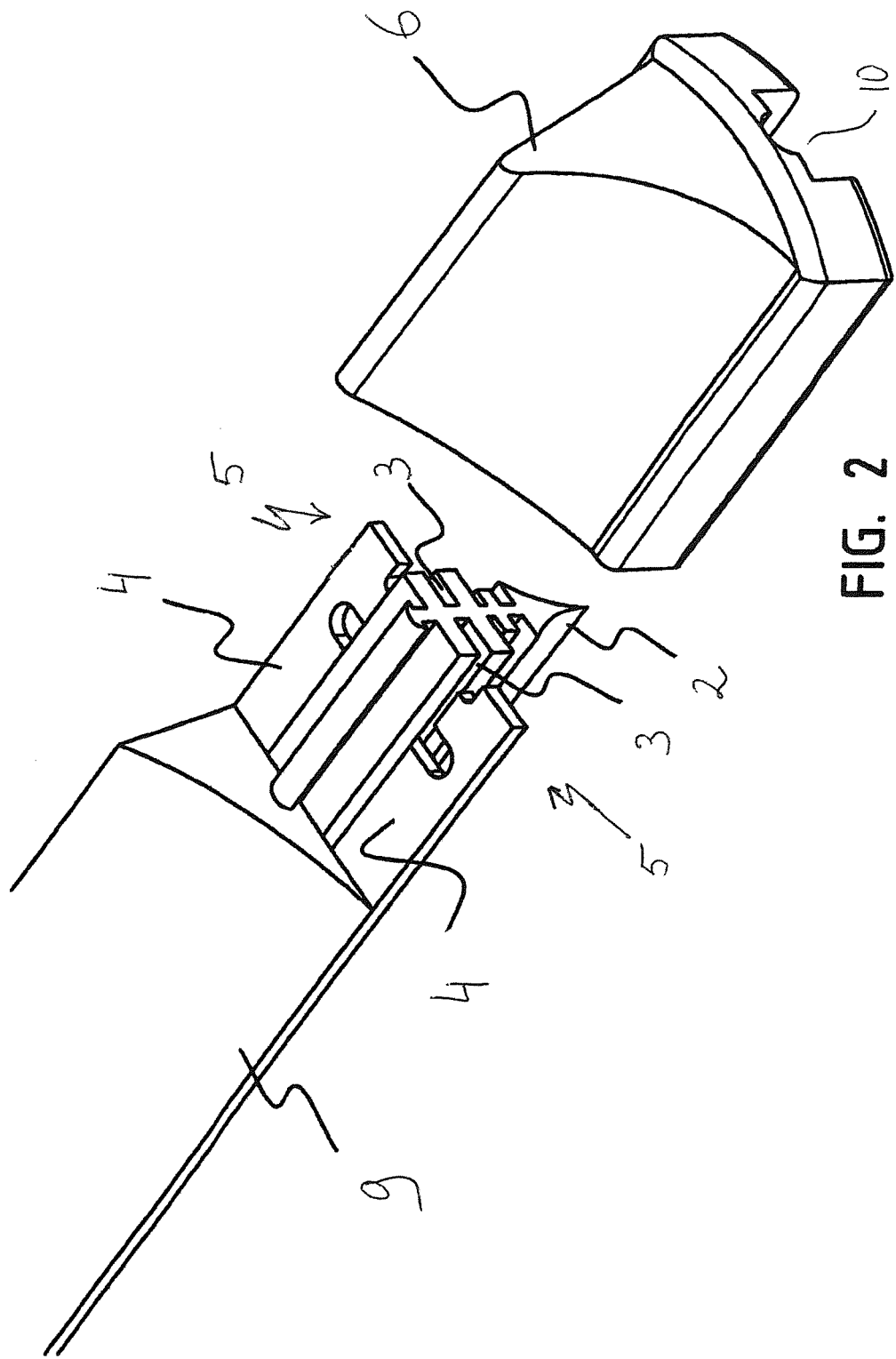
FIG. 2 shows a detail of the windscreen wiper device of FIG. 1.

FIGS. 1 and 2 show a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. the strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 or "end caps". The windscreen wiper device 1 is further equipped with a connecting device 7 for an oscillating arm 8, and a spoiler 9.

FIG. 2 shows a free end of the windscreen wiper device 1 of FIG. 1. Corresponding parts have been designated with the same reference numerals. As can be seen from FIG. 2, the connecting piece 6 is provided with an opening 10 in order to allow a relative movement of the wiper blade 2 along the strips 4 inside the connecting piece 6, so that the connecting piece 6 does not block the wiper blade 2 during use. The connecting pieces 6 or "end caps" are made of one piece of plastic.

As illustrated in FIG. 1, the windscreen wiper arm 8 according to the invention comprises a aluminium mounting head 11 which can be fixed for rotation to a shaft 12 driven, via a mechanism not illustrated, by a small motor. the windscreen wiper arm 8 further comprises a steel arm member 13 supported by the mounting head 18, wherein the arm member 13 in turn supports the wiper blade 2 with the help of the connecting device 7. The arm member 13 is pivotally connected to the mounting head 11 by means of a pivot pin 14. In use, the shaft 12 rotates alternately in a clockwise and in a counter-clockwise sense carrying the mounting head 11 into rotation also, which in turn draws the arm member 13 into rotation and by means of the connecting device 7 moves the wiper blade 2.

Figure 3:
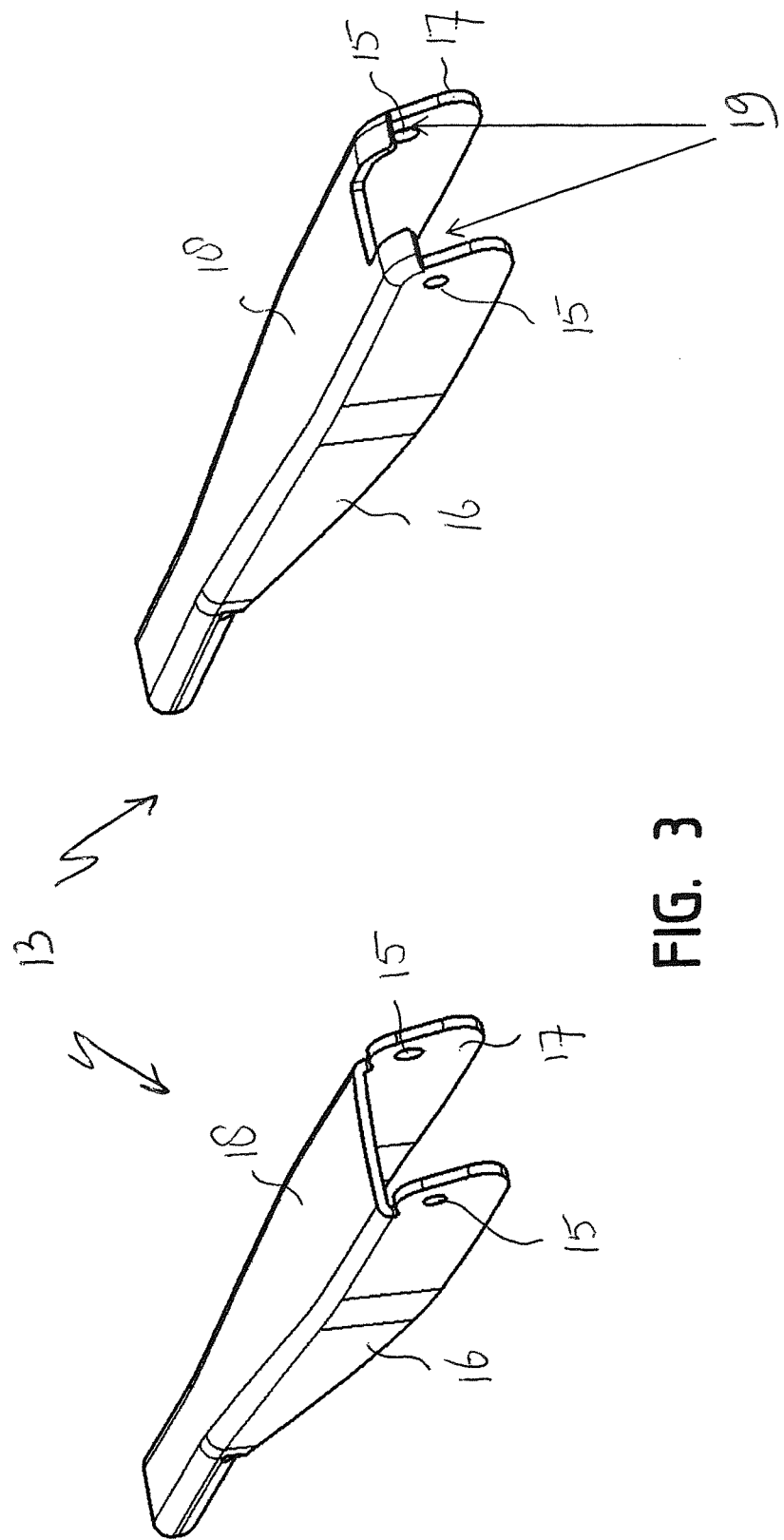
FIG. 3 is a perspective, schematic view of a standard arm member and an arm member used in the windscreen wiper arm shown in FIG. 1, respectively.
Figure 4:
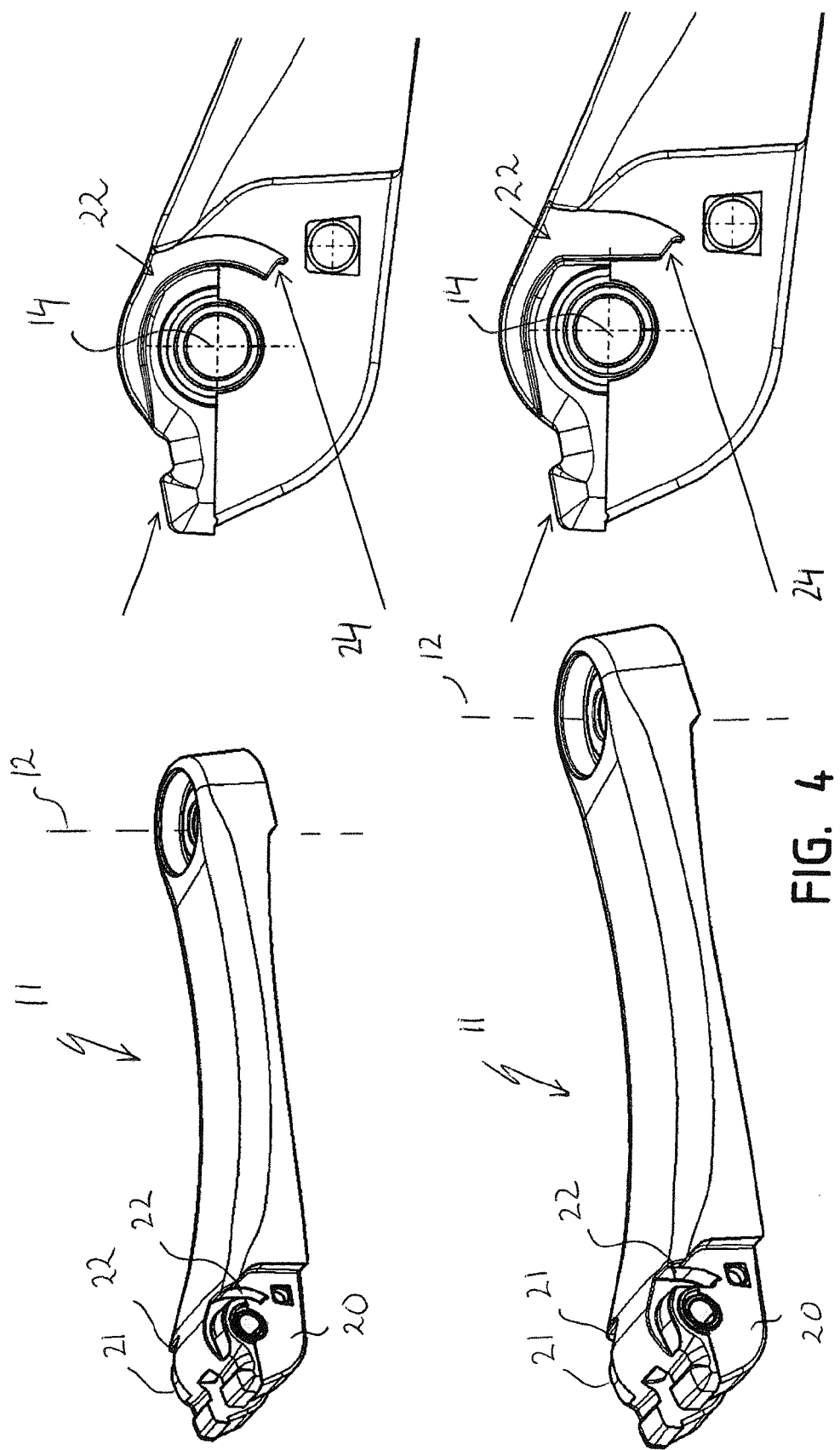
FIG. 4 is a perspective, schematic view, as well as a cross-sectional view of two preferred embodiments of a mounting head according to the invention.

As illustrated in FIG. 3, a standard arm member 13 on the left and an arm member 13 according to the invention on the right each have a substantially U-shaped cross-section near the pivot pin 14 (inserted through co-axial openings 15 thereof) comprising two side walls 16,17 and a base 18.

According to the invention the arm member 13 (on the right in FIG. 3) comprises in one piece therewith two outwardly extending fingers 19 having a mutually corresponding shape and each extend outwardly from the base 18 of the U-shaped cross-section of the arm member 13 in a direction towards the drive shaft 12. As depicted, the fingers 19 are spaced-apart and are located near longitudinal edges of the base 18 of the U-shape cross-section of the arm member 13. The function of the fingers 19 will be explained hereunder.

With reference to FIGS. 1 through 4, a part of the mounting head 11 extends between the side walls 16,17 of the arm member 13 and beyond the pivot pin 14. the part is provided with opposite abutting surfaces 20,21 for abutting against the side walls 16,17. Each abutting surface 20,21 of the part of the mounting head 11 is provided with a curved guiding groove 22. According to a first preferred embodiment of the invention the guiding groove 22 (on the left and on the right at the top in FIG. 4) has a shape of a part of a circle, for example a half of a circle. In a second preferred embodiment of the invention the guiding groove 22 (on the left and on the right at the bottom in FIG. 4) extends along a straight line. The two outwardly extending fingers 19 (being somewhat curved near their free ends) on the arm member 13 each cooperate with a guiding groove 22 on opposite sides of the mounting head 11. In other words, the fingers 19 are allowed to slide inside the grooves 22 between a "service position" (that is a mounting, cleaning and/or repair position, for example) and a "working position" (that is a wiping position, see FIG. 1) of the oscillating arm 8, as will be explained in detail further with the help of FIGS. 6 and 7. In the "service position" (FIG. 7) a free end 23 ("extremity") of each finger 19 abuts against an end wall 24 ("extremity") of a corresponding groove 22, whereas in the "working position" (FIG. 6) the free ends 23 of the fingers 19 are spaced-apart from the end walls 24 of the grooves 22. the free ends 23 of the fingers 19 and the end walls 24 of the grooves 22 form stop surfaces avoiding that in the "service position" the arm member 19 is allowed to be pivoted beyond a predetermined angle with respect to the mounting head 11. the first preferred embodiment is shown on the left at the bottom of FIGS. 6 and 7, whereas the second preferred embodiment is shown on the right at the bottom of FIGS. 6 and 7.

Figure 5:
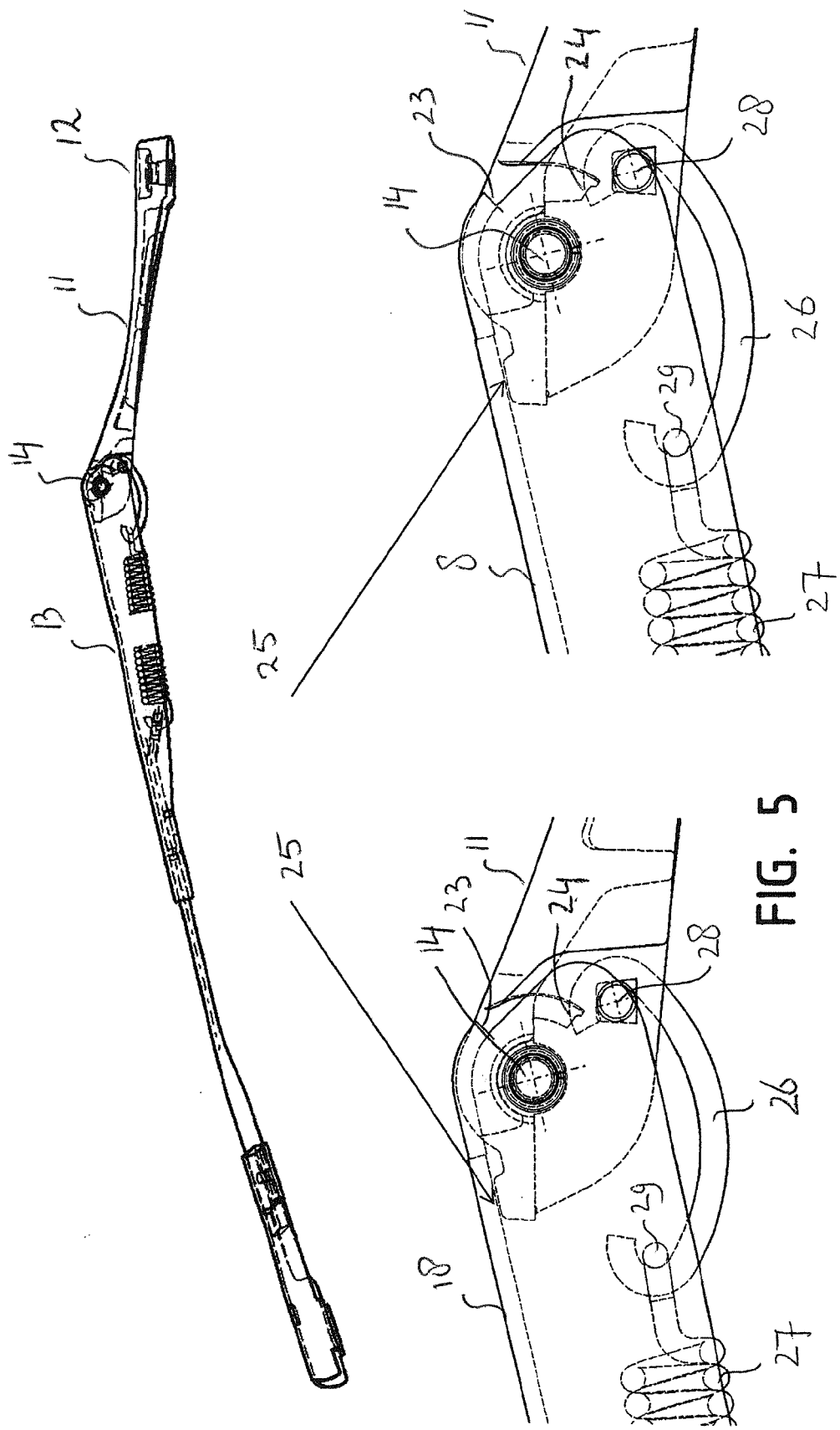
FIG. 5 shows cross-sectional views of an interconnection of an arm member and a mounting head of two preferred embodiments of a windscreen wiper arm according to the invention in a "rest position"

With reference to FIG. 5 the part of the mounting head 11 extends between the side walls 16,17 of the arm member 13 and beyond the pivot pin 14 is provided on its upper side with a blockage 25 acting as a stop surface to the base 18 of the U-shaped arm member 13 in a "rest position", that is in unmounted position.

Figure 6:
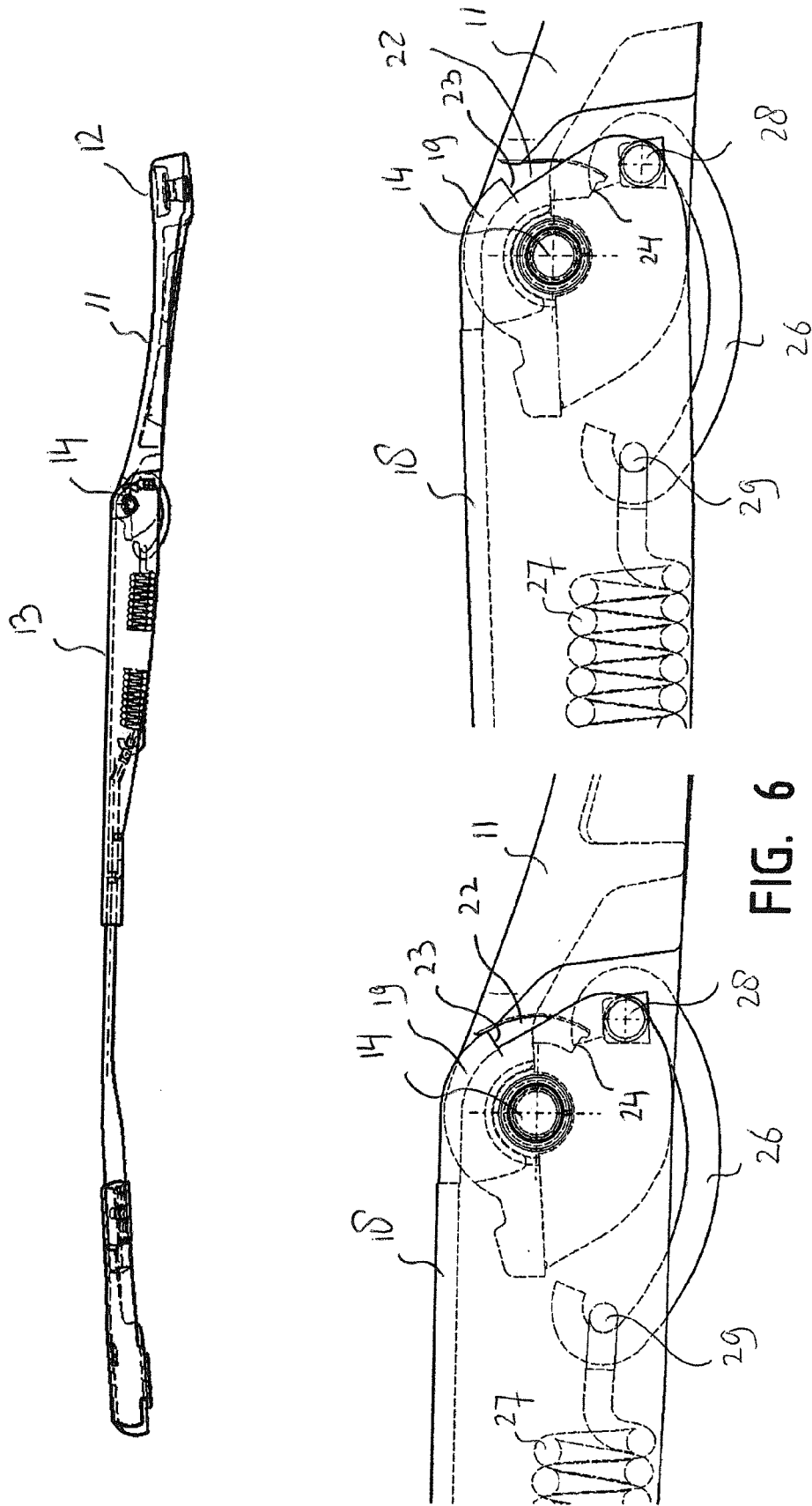

As shown in FIGS. 5 and 6, a hook-shaped bracket 26 connected to a spring 27 is hooked with its first end on a pin 28 on the mounting head 11 and with its second end onto a part 29 of the arm member 13 in order to ensure that the arm member 13 and thus the wiper blade 2 connected thereto is pressed onto a windscreen to be wiped. Both the pivot pin 14 and the pin 28 are located above the hook-shaped element 26, so that side walls 16,17 of the arm member 13 cover the grooves 22 from the outside in all positions of the arm member 13 relative to the mounting head 11. Consequently, the grooves 22 are not visible from the outside. Further, dust and/or ice is prevented to enter the grooves 22, so that an efficient and reliable articulation between the arm member 13 and the mounting head 11 is maintained at all times.

As shown in FIG. 7, in the "service position" of the arm member 13, the stop surfaces 23,24 are located at the other side of a central axis 30 of the spring 27 than the pivot pin or rivet 14.

The invention is not restricted to the embodiment shown, but extends also to other embodiments falling within the scope of the appended claims.

The invention claimed is:

1. A windscreen wiper arm, comprising a mounting head mountable adjacent one end thereof on a drive shaft and an arm member pivotally connected to the mounting head adjacent an opposite end thereof by means of a pivot pin, wherein the arm member has a substantially U-shaped cross-section near said pivot pin comprising two side walls, wherein a part of the mounting head extends between the side walls and beyond said pivot pin, wherein said part is provided with opposite abutting surfaces for abutting against the side walls of the arm member, wherein at least one guiding groove is provided on at least one of said abutting surfaces of said part of said mounting head, and including at least one outwardly extending finger on said arm member cooperating with said guiding groove, wherein said finger is movable in said guiding groove between a first position corresponding with a wiping position of the arm member and a second position corresponding with a mounting position of the arm member, and wherein said at least one finger extends outwardly from a base of the U-shaped cross-section of said arm member in a direction towards said one end of said mounting head and further is integrally formed along an outer side edge thereof with one of said side walls and is laterally spaced along an inner side edge thereof from the other of said side walls of said arm member.

2. The windscreen wiper arm according to claim 1, wherein in a wiping position of the arm member one of the side walls of the arm member covers said guiding groove from the outside, wherein in a mounting position of the arm member, a free end of said finger and an end wall of said guiding groove are located on one side of a line through a central axis of a spring, and wherein said pivot pin is located on the other side thereof.

3. The windscreen wiper arm according to claim 1, wherein said finger is curved.

4. The windscreen wiper arm according to claim 1, wherein said guiding groove is curved.

5. The windscreen wiper arm according to claim 4, wherein said guiding groove extends along a part of a circle.

6. The windscreen wiper arm according to claim 1, wherein there are two of said guiding grooves on each abutting surface of said part of said mounting head, as well as two outwardly extending fingers on said arm member each cooperating with a guiding groove.

7. The windscreen wiper arm according to claim 1, wherein the arm member is made of a metal.

8. The windscreen wiper arm according to claim 7, wherein the metal is steel.

9. A windscreen wiper device comprising a windscreen wiper arm according to claim 1.

10. The windscreen wiper device according to claim 9, wherein it comprises an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein ends of said longitudinal strip are connected with a respective connecting piece, which windscreen wiper device comprises a connecting device for the windscreen wiper arm.

11. A method for manufacturing a windscreen wiper arm, particularly for automobiles, comprising preparing a mounting head mountable on a drive shaft and preparing an arm member pivotally connected to the mounting head by means of a pivot pin, wherein the arm member has a substantially U-shaped cross-section near said pivot pin comprising two side walls, wherein a part of the mounting head extends between the side walls and beyond said pivot pin, wherein said part is provided with opposite abutting surfaces for abutting against the side walls of the arm member, wherein the mounting head and said arm member are provided with structure for limiting a pivot angle of the arm member, and wherein the structure is provided in the form of at least one guiding groove on at least one of said abutting surfaces of said part of said mounting head, as well as with at least one outwardly extending finger on said arm member cooperating with said guiding groove, wherein said at least one finger is movable in said at least one groove between a first position corresponding with a wiping position of the arm member and a second position corresponding with a mounting position of the arm member, and wherein said at least one finger extends outwardly from a base of the U-shaped cross-section of said arm member and is integrally formed along an outer side edge thereof with one of the side walls of the arm and is laterally spaced from the other side wall along an inner side edge of the at least one finger.

* * * * *